(12) United States Patent
Chou et al.

(10) Patent No.: US 7,781,991 B2
(45) Date of Patent: Aug. 24, 2010

(54) HEAT DISSIPATION SYSTEM AND METHOD

(75) Inventors: Yu-Shan Chou, Taipei Hsien (TW);
Po-Lin Wang, Taipei Hsien (TW);
Ching-Te Chu, Taipei Hsien (TW)

(73) Assignee: Hon Hai Precision Industry Co., Ltd.,
Tu-Cheng, Taipei Hsien (TW)

( * ) Notice: Subject to any disclaimer, the term of this patent is extended or adjusted under 35 U.S.C. 154(b) by 334 days.

(21) Appl. No.: 11/964,785

(22) Filed: Dec. 27, 2007

(65) Prior Publication Data

US 2009/0120631 A1    May 14, 2009

(30) Foreign Application Priority Data

Nov. 14, 2007    (CN) .................... 2007 1 0202532

(51) Int. Cl.
*H02P 5/46* (2006.01)
(52) U.S. Cl. .................... 318/68; 318/567; 318/634

(58) Field of Classification Search ............ 318/68, 318/567, 634, 471, 472, 807; 364/148; 388/907.5; 700/28
See application file for complete search history.

(56) References Cited

U.S. PATENT DOCUMENTS

| 7,018,048 | B2 | 3/2006 | Ito et al. | |
| 2004/0054938 | A1* | 3/2004 | Belady et al. | 713/300 |
| 2006/0236706 | A1* | 10/2006 | Hsieh et al. | 62/178 |

* cited by examiner

*Primary Examiner*—Karen Masih
(74) *Attorney, Agent, or Firm*—Jeffrey T. Knapp

(57) ABSTRACT

A heat dissipation system used in an electronic device includes a plurality of fans positioned in the electronic device, a sensing module, and a processing module. The sensing module is configured for detecting temperature, relative humidity, and air pressure of airflow flowing in the electronic device. The processing module is configured for adjusting a voltage applied to each of the plurality of fans according to the detected temperature, relative humidity, and air pressure of the airflow.

6 Claims, 2 Drawing Sheets

HEAT DISSIPATION SYSTEM AND METHOD

BACKGROUND

1. Field of the Invention

The present invention relates to heat dissipation technology, and particularly, to a heat dissipation system and method for an electronic device.

2. Description of Related Art

Heat dissipation for electronic devices, such as projectors and personal computers, is important to ensure smooth operation of the electronic devices. However, heat dissipation design is aimed at certain environments in which the electronic devices are designed to be used. Therefore, usage of the electronic devices is restricted to the certain environments due to limitations of the heat dissipation design.

What is needed, therefore, is to provided a heat dissipation system for an electronic device which maintains good heat dissipation even if the electronic device is used in different environments.

SUMMARY

The present invention relates to a heat dissipation system used in an electronic device. The heat dissipation system used in an electronic device includes a plurality of fans positioned in the electronic device, a sensing module, and a processing module. The sensing module is configured for detecting temperature, relative humidity, and air pressure of airflow flowing in the electronic device. The processing module is configured for adjusting a voltage applied to each of the plurality of fans according to the detected temperature, relative humidity, and air pressure of the airflow.

Other advantages and novel features of the present invention will become more apparent from the following detailed description of present embodiments when taken in conjunction with the accompanying drawings, in which:

DETAILED DESCRIPTION OF THE EMBODIMENTS

Reference will now be made to the figures to describe the at least one present embodiment in detail.

Figure 1:
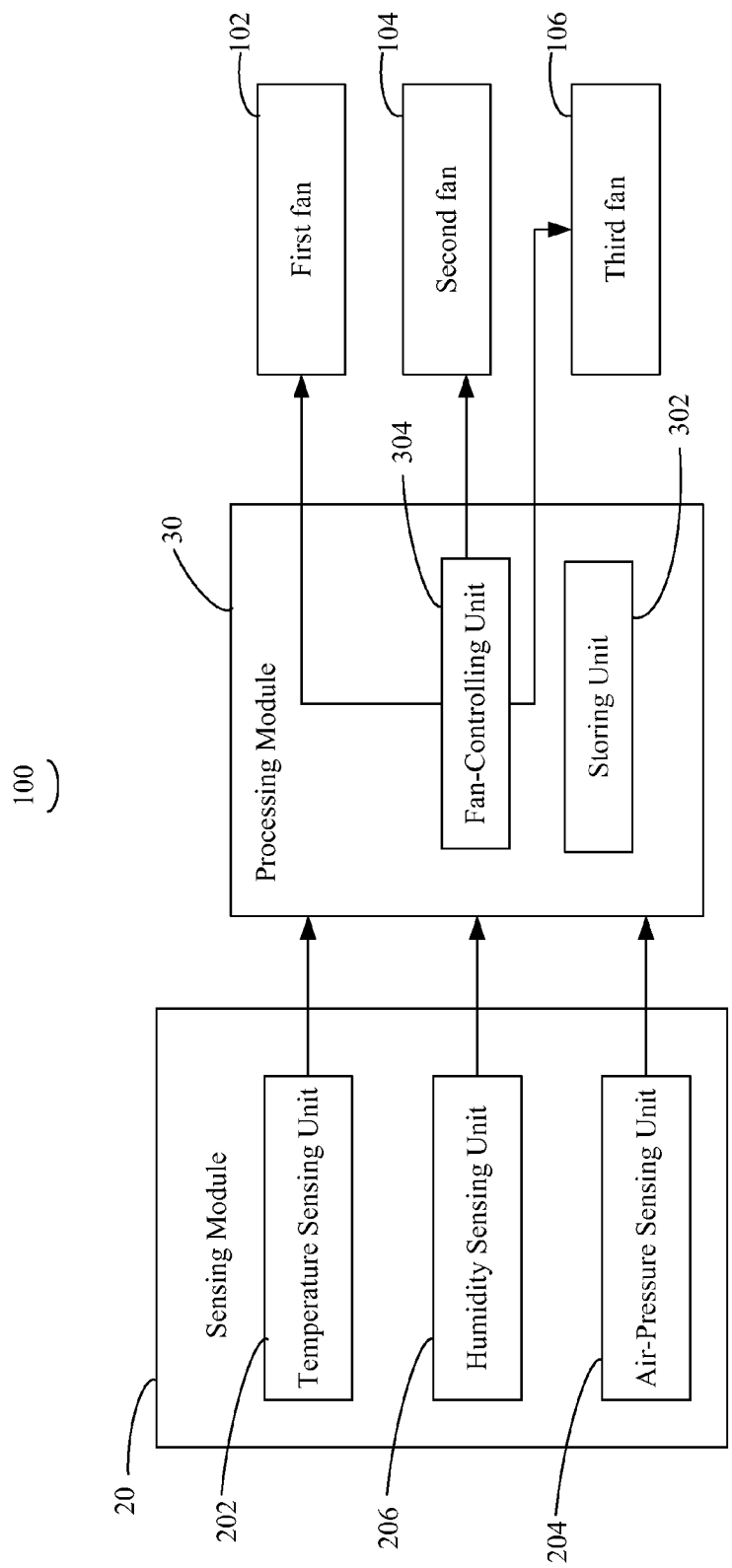
FIG. 1 is functional diagram of modules of a heat dissipating system in accordance with a first present embodiment.

Referring to FIG. 1, a heat dissipation system 100, in accordance with a first present embodiment, is shown. The heat dissipation system 100 may be built in an electronic device, such as a projector or a personal computer. The heat dissipation system includes a sensing module 20, a processing module 30, a first fan 102, a second fan 104, and a third fan 106. The sensing module 20 includes a temperature sensing unit 202, an air-pressure sensing unit 204, and a relative-humidity sensing unit 206. The temperature sensing unit 202, the air-pressure sensing unit 204, and the relative-humidity sensing unit 206 are positioned in the electronic device at an air inlet thereof, and configured for cooperatively detecting temperature, air pressure, and relative humidity of airflow flowing into the electronic device respectively. The first fan 102, the second fan 104, and the third fan 106, are positioned at an outlet or outlets of the electronic device.

The processing module 30 is configured for adjusting a voltage applied to each of the first, second and third fans 102, 104, 106 according to the detected temperature, relative humidity, and air pressure of the airflow. In this present embodiment, the processing module 30 adjusts a first, a second, and a third voltage applied to the first, second, and third fans respectively according to the computation for better controlling rotating speeds of the first, second and third fans to properly exhaust heat generated in the electronic device. The processing module 30 includes a storing unit (e.g., a memory) 302, and a fan-controlling unit 304. It is to be understood that other numbers of fans (i.e., not just three) could be positioned at the outlet of the electronic device, and still be within the scope of the present embodiment.

In this present embodiment, the first voltage $V_{Fan1}$ applied to the first fan is found with the following formula:

$$V_{Fan1} = K \times Q_{Fan1.spec} \times I_{system} \times \frac{P_a}{P_0} \times \frac{T_0}{T_a} \times \frac{S_a}{S_0} \times J_{Fan1} \times \frac{1}{Q_{Fan1.spec}} \times V_{Fan1.spec},$$

the second voltage $V_{Fan2}$ applied to the second fan is found with the following formula:

$$V_{Fan2} = K \times Q_{Fan2.spec} \times I_{system} \times \frac{P_a}{P_0} \times \frac{T_0}{T_a} \times \frac{S_a}{S_0} \times J_{Fan2} \times \frac{1}{Q_{Fan2.spec}} \times V_{Fan2.spec},$$

and the third voltage $V_{Fan3}$ applied to the third fan is found with the following formula:

$$V_{Fan3} = K \times Q_{Fan3.spec} \times I_{system} \times \frac{P_a}{P_0} \times \frac{T_0}{T_a} \times \frac{S_a}{S_0} \times J_{Fan3} \times \frac{1}{Q_{Fan3.spec}} \times V_{Fan3.spec},$$

where $T_a$ is the temperature sensed by the temperature sensing unit; $P_a$ is the air pressure sensed by the air-pressure element; $S_a$ is the relative humidity sensed by the relative-humidity sensing unit; K is a constant which is obtained experimentally; $I_{system}$ is airflow impedance inside the electronic device; $P_0$ is a reference atmosphere pressure, e.g., a standard atmosphere; $T_0$ is a reference temperature (e.g., 25° C.); $S_0$ is a reference relative humidity (e.g., 75%); $J_{Fan1}$ is a ratio of amount of air exhausted by the first fan to air exhausted by all three fans of the electronic device; $J_{Fan2}$ is a ratio of amount of air exhausted by the second fan to the air exhausted by all three fans of the electronic device; $J_{Fan3}$ is a ratio of amount of air exhausted by the third fan to air exhausted by all three fans of the electronic device; $Q_{Fan1.spec}$ is amount of air exhausted (moved) under normal conditions as specified in specification of the first fan; $Q_{Fan2.spec}$ is amount of air exhausted under normal conditions as specified in specification of the second fan; $Q_{Fan3.spec}$ is amount of air exhausted under normal conditions as specified in specification of the third fan; $V_{Fan1.spec}$ is a nominal operating voltage specified in the specification of the first fan; $V_{Fan2.spec}$ is a nominal operating voltage specified in specification of the second fan; $V_{Fan3.spec}$ is a nominal operating voltage specified in specification of the third fan. For example, in a typical projector, the $V_{Fan1.spec}$, $V_{Fan2.spec}$, and $V_{Fan3.spec}$ are generally 12 voltages.

It is to be understood that values of $P_0$, $T_0$, and $S_0$ are designed by the manufacturers according to environments in which the electronic device is usually used.

Alternatively, the processing module 30 may read a data table stored in the storing unit 302 to get appropriate the first, second and third voltages based on the detected temperature, relative humidity, and air pressure of the airflow. The data table shows a relationship between the voltage applied to each of the plurality of fans and the temperature, relative humidity, and air pressure of the airflow. The data table includes at least four columns: a first column including data of temperature, a second column including data of relative humidity, a third column including data of air pressure, and a fourth column including data of voltages. That is, the data of voltages are voltages applied to the first, second and/or third fans according to the temperature, air pressure, and relative humidity. In the present embodiment, the data table (table 1) below shown as an example includes six columns: a first column including data of temperature, a second column including data of relative humidity, a third column including data of air pressure, a fourth column including data of the first voltages, a fifth column including data of the second voltages, and a sixth column including data of the third voltages.

TABLE 1

| Temperature (° C.) | Relative Humidity (%) | Air-pressure (atm) | First Voltage (V) | Second Voltage (V) | Third Voltage (V) |
|---|---|---|---|---|---|
| 16~20 | 91~100 | >1.3 | 6.5 | 6.5 | 7 |
| 16~20 | 91~100 | 1.2~1.3 | 6.8 | 6.8 | 7.3 |
| 16~20 | 91~100 | 1.1~1.2 | 6.8 | 6.8 | 7.3 |
| 16~20 | 91~100 | 1~1.1 | 7 | 7 | 7.5 |
| 16~20 | 91~100 | 0.9~1 | 7 | 7 | 7.5 |
| 16~20 | 91~100 | 0.8~0.9 | 7 | 7 | 7.5 |
| 16~20 | 91~100 | 0.7~0.8 | 7.2 | 7.2 | 7.7 |
| 16~20 | 91~100 | 0.6~0.7 | 7.2 | 7.2 | 7.7 |
| 16~20 | 91~100 | 0.5~0.6 | 7.5 | 7.5 | 8 |
| 16~20 | 91~100 | <0.5 | 7.5 | 7.5 | 8 |
| 16~20 | 71~90 | >1.3 | 6.7 | 6.7 | 7.2 |
| 16~20 | 71~90 | 1.2~1.3 | 7 | 7 | 7.5 |
| 16~20 | 71~90 | 1.1~1.2 | 7 | 7 | 7.5 |
| 16~20 | 71~90 | 1~1.1 | 7.2 | 7.2 | 7.7 |
| 16~20 | 71~90 | 0.9~1 | 7.2 | 7.2 | 7.7 |
| 16~20 | 71~90 | 0.8~0.9 | 7.2 | 7.2 | 7.7 |
| 16~20 | 71~90 | 0.7~0.8 | 7.4 | 7.4 | 7.9 |
| 16~20 | 71~90 | 0.6~0.7 | 7.4 | 7.4 | 7.9 |
| 16~20 | 71~90 | 0.5~0.6 | 7.7 | 7.7 | 8.2 |
| 16~20 | 71~90 | <0.5 | 7.7 | 7.7 | 8.2 |
| 16~20 | 51~70 | >1.3 | 6.9 | 6.9 | 7.4 |
| 16~20 | 51~70 | 1.2~1.3 | 7.2 | 7.2 | 7.7 |
| 16~20 | 51~70 | 1.1~1.2 | 7.2 | 7.2 | 7.7 |
| 16~20 | 51~70 | 1~1.1 | 7.4 | 7.4 | 7.9 |
| 16~20 | 51~70 | 0.9~1 | 7.4 | 7.4 | 7.9 |
| 16~20 | 51~70 | 0.8~0.9 | 7.4 | 7.4 | 7.9 |
| 16~20 | 51~70 | 0.7~0.8 | 7.6 | 7.6 | 8.1 |
| 16~20 | 51~70 | 0.6~0.7 | 7.6 | 7.6 | 8.1 |
| 16~20 | 51~70 | 0.5~0.6 | 7.9 | 7.9 | 8.4 |
| 16~20 | 51~70 | <0.5 | 7.9 | 7.9 | 8.4 |
| 16~20 | 31~50 | >1.3 | 7.1 | 7.1 | 7.6 |
| 16~20 | 31~50 | 1.2~1.3 | 7.4 | 7.4 | 7.9 |
| 16~20 | 31~50 | 1.1~1.2 | 7.4 | 7.4 | 7.9 |
| 16~20 | 31~50 | 1~1.1 | 7.6 | 7.6 | 8.1 |
| 16~20 | 31~50 | 0.9~1 | 7.6 | 7.6 | 8.1 |
| 16~20 | 31~50 | 0.8~0.9 | 7.6 | 7.6 | 8.1 |
| 16~20 | 31~50 | 0.7~0.8 | 7.8 | 7.8 | 8.3 |
| 16~20 | 31~50 | 0.6~0.7 | 7.8 | 7.8 | 8.3 |
| 16~20 | 31~50 | 0.5~0.6 | 8.1 | 8.1 | 8.6 |
| 16~20 | 31~50 | <0.5 | 8.1 | 8.1 | 8.6 |
| 16~20 | 0~30 | >1.3 | 7.3 | 7.3 | 7.8 |
| 16~20 | 0~30 | 1.2~1.3 | 7.6 | 7.6 | 8.1 |
| 16~20 | 0~30 | 1.1~1.2 | 7.6 | 7.6 | 8.1 |
| 16~20 | 0~30 | 1~1.1 | 7.8 | 7.8 | 8.3 |
| 16~20 | 0~30 | 0.9~1 | 7.8 | 7.8 | 8.3 |
| 16~20 | 0~30 | 0.8~0.9 | 7.8 | 7.8 | 8.3 |
| 16~20 | 0~30 | 0.7~0.8 | 8 | 8 | 8.5 |
| 16~20 | 0~30 | 0.6~0.7 | 8 | 8 | 8.5 |
| 16~20 | 0~30 | 0.5~0.6 | 8.3 | 8.3 | 8.8 |
| 16~20 | 0~30 | <0.5 | 8.3 | 8.3 | 8.8 |

It is to be understood that the above data table 1 is one data table as an example for describing the present embodiment.

Figure 2:
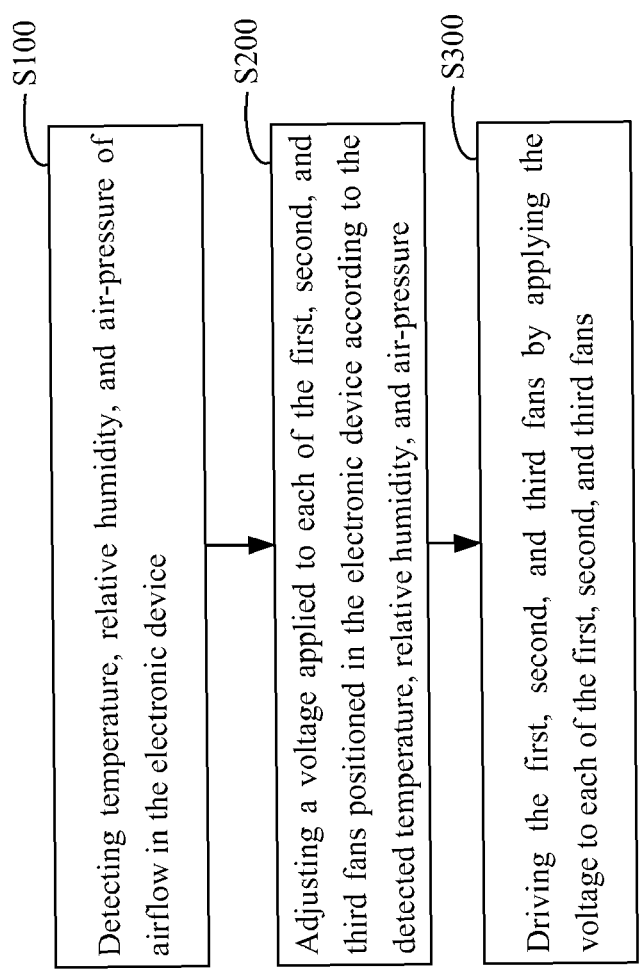
FIG. 2 is a flow chart of a heat dissipating method in accordance with a second present embodiment.

Referring to FIG. 2, a flow chart of a heat dissipation method, in accordance with a second present embodiment, is shown. The method includes:

sensing temperature, relative humidity, and air-pressure of air flowing into the electronic device via the inlet, shown as S100;

detecting temperature, relative humidity, and air-pressure of airflow in the electronic device, shown as S200;

adjusting a voltage applied to each of the first, second, and third fans positioned in the electronic device according to the detected temperature, relative humidity, and air-pressure, shown as S200; and driving the first, second, and third fans by applying the voltage to each of the first, second, and third of fans, shown as S300.

In the S100 step, the temperature, relative humidity, and air-pressure are detected by the temperature sensing unit 202, the relative-humidity sensing unit 206, and the air-pressure sensing unit 204 respectively.

In the S200 step, the processing module adjusts the first, second and third voltages applied to the first, second and third fans according to the detected temperature, relative humidity, and air-pressure of the airflow.

In the S300 step, the fan-controlling unit 304 drives the first, second, and third fans by applying the first, second, and third voltages to the first, second and third fans.

Since voltages applied to the first, second and third fans are determined according to the detected temperature, relative humidity, and air-pressure of the airflow flowing into the electronic device, adaptability of the heat dissipation system 100 of the electronic device to different environments is enhanced. Therefore, the heat dissipation system can maintain good heat dissipation even if the electronic device is used in different environments.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heat dissipation system used in an electronic device, the system comprising:
   a plurality of fans positioned in the electronic device;

a sensing module configured for detecting temperature, relative humidity, and air pressure of airflow flowing in the electronic device; and a processing module configured for adjusting a voltage applied to each of the plurality of fans according to the detected temperature, relative humidity, and air pressure of the airflow, wherein the voltage applied to each of the plurality of fans satisfies the formula:

$$V_{Fan} = K \times Q_{Fan.spec} \times I_{system} \times \frac{P_a}{P_0} \times \frac{T_0}{T_a} \times \frac{S_a}{S_0} \times J_{Fan} \times \frac{1}{Q_{Fan.spec}} \times V_{Fan.spec},$$

where Ta is the temperature sensed by the temperature sensing unit; Pa is the air pressure sensed by the air-pressure element; Sa is the relative humidity sensed by the relative-humidity sensing unit; K is a constant; Isystem is flowed impedance inside the electronic device; P0 is a reference atmosphere pressure; T0 is a reference temperature; S0 is a reference relative humidity; JFan is a ratio of amount of air exhausted by the fan to total amount of air exhausted by the plurality of fans; QFan.spec is amount of air specified in specification of each of the plurality of fans; VFan.spec is a corresponding operating voltage specified in a specification of each of the plurality of fans.

2. The system as claimed in claim 1, wherein the sensing module includes a temperature sensing unit for sensing the temperature of the airflow in the electronic device at an inlet thereof, a relative-humidity sensing unit for sensing the relative humidity of the airflow in the electronic device at the inlet thereof, and an air-pressure sensing unit for sensing the air pressure of airflow in the electronic device at the inlet thereof.

3. The system as claimed in claim 1, wherein the processing module comprises a storing unit for storing a data table; the data table showing a relationship between the voltage applied to each of the plurality of fans and the temperature, relative humidity, and air pressure of the airflow;

the processing module being configured for reading in the data table to get the appropriate voltage based on the detected temperature, relative humidity, and air pressure of the airflow.

4. The system as claimed in claim 1, wherein the processing module comprises a fan controlling unit for driving the plurality of fans.

5. A method for dissipating heat in an electronic device, the method comprising:

detecting temperature, relative humidity, and air-pressure of airflow in the electronic device;

adjusting a voltage applied to each of the plurality of fans positioned in the electronic device according to the detected temperature, relative humidity, and air-pressure, wherein the voltage applied to each of the plurality of fans satisfies the formula:

$$V_{Fan} = K \times Q_{Fan.spec} \times I_{system} \times \frac{P_a}{P_0} \times \frac{T_0}{T_a} \times \frac{S_a}{S_0} \times J_{Fan} \times \frac{1}{Q_{Fan.spec}} \times V_{Fan.spec},$$

where Ta is the temperature sensed by the temperature sensing unit; Pa is the air pressure sensed by the air-pressure element; Sa is the relative humidity sensed by the relative-humidity sensing unit; K is a constant; Isystem is flow impedance inside the electronic device; P0 is a reference atmosphere pressure; T0 is a reference temperature; S0 is a reference relative humidity; JFan is a ratio of amount of air exhausted by each of the plurality of fans to total amount of air exhausted by the plurality of fans; QFan.spec is amount of air exhausted/moved under normal operating conditions as specified in a specification of each of the plurality of fans; VFan.spec is a corresponding operating voltage specified in the specification of each of the plurality of fans; and driving the plurality of fans by applying the voltage to each of the plurality of fans.

6. The method as claimed in claim 5, wherein the voltage applied to each of the plurality of fans is found by looking up a data table stored in the electronic device; the data table showing a relationship between the voltage applied to each of the plurality of fans and the temperature, relative humidity, and air pressure of the airflow; the processing module being configured for reading in the data table to get the appropriate voltage based on the detected temperature, relative humidity, and air pressure of the airflow.

* * * * *